United States Patent [19]

Vance

[11] Patent Number: 5,123,200
[45] Date of Patent: Jun. 23, 1992

[54] RAT AND MOUSE TRAP

[76] Inventor: David L. Vance, 112 E. 23rd St. Apt. 1, Roswell, N. Mex. 88201

[21] Appl. No.: 710,452

[22] Filed: Jun. 5, 1991

[51] Int. Cl.$^5$ .............................................. A01M 23/00
[52] U.S. Cl. .............................................. 43/61; 43/81
[58] Field of Search ............................ 43/61, 81.5, 81

[56] References Cited

U.S. PATENT DOCUMENTS

| 1,650,455 | 11/1927 | Lewis | 43/61 |
| 4,158,929 | 6/1976 | Custard | 43/61 |
| 4,569,149 | 2/1986 | Sensing et al. | 43/61 |
| 4,682,440 | 7/1987 | Hunter | 43/61 |
| 4,926,581 | 5/1990 | Grivas | 43/61 |

FOREIGN PATENT DOCUMENTS

| 477943 | 10/1951 | Canada | 43/61 |
| 915385 | 11/1946 | France | 43/61 |

Primary Examiner—Richard K. Seidel
Assistant Examiner—Jeanne M. Elpel

[57] ABSTRACT

A holding trap for small animals, most specifically rats and mice. In the preferred embodiment, a single sheet of paperboard, die stamped to a pattern and assembled by folding, forms, together; an enclosure with parallel sides and large enough for entrance of the anterior portion of an animal; an animal engaging member hinging from the entrance to the enclosure and provided at its free end with points; a mechanism for holding the hinging member, against the force of a rubber band, inward and open; and a member supported horizontally over a bait on a fulcrum and serving as a lever which, moved by an animal, releases the mechanism to position the points of the hinging member inwardly against the animal's body; creating a holding grip which increases as the animal attempts to withdraw from the trap.

8 Claims, 2 Drawing Sheets

RAT AND MOUSE TRAP

BACKGROUND OF THE INVENTION

The present invention relates generally to small animal traps, and more specifically to a low cost device with structure and function based on habits and behaviors of rats and mice.

The destructive nature of certain old world rats and mice is well known. While one such creature may disrupt a home, the effect of numbers of these animals in the world at large, as they spread disease and compete with man for food, may be considered an ongoing natural disaster, and in fact, conditions which follow a disaster or which exist in areas of poverty are often advantageous for rapid growth in populations of such rodents, further adding to the burden of a community when it is least able to afford effective measures of control. Also, industries which entail the production or storage of food suffer large annual losses to these animals, so must wage efforts against increases in their populations. Though a number of means are used to control rats and mice, situations exist when trapping by single traps is the preferable method and in these situations a need for the most generally efficient means is clear.

Many forms and improvements of devices designed to catch rats and mice have been offered in prior art, yet it seems that no single device extant embodies all the advantages necessary for a high degree of success in a wide range of applications. The disadvantages of prior art inventions are generally shared by like members of their type and may be addressed by examining those types.

Traps that are designed to capture by imprisoning, including those devices known as live traps as well as some that are adapted to kill, must be larger than the animal and therefore are bulky. To hold rats and mice, such traps must also be constructed of material resistant to gnawing, adding to the cost of manufacture. As to effectiveness, such traps require of the animal a full commitment of its body to an enclosure. To overcome caution on the part of the animal, such traps use a bait, usually placed near the back of the trap, as a lure. Often, and especially when food is readily available elsewhere, this is not sufficient inducement. Generally, imprisoning traps do not sufficiently entice the animal.

Traps that are designed to capture by gripping, particularly those which are intended to grip the leg, are not efficient when applied to an animal which may affect release by gnawing. Furthermore, in past years, public awareness of the pain caused by such traps has created an aversion to their use and a call for devices which are more humane. The disadvantage of prior traps that grip and the reason they cause pain is that the pressure such devices generate is fixed by the amount of energy transmitted to a jaw or set of jaws by a spring. Also, these traps must spring or snap shut quickly to catch a quick animal. This holding pressure, therefore, is established at a maximum level and usually causes injury.

Generically termed humane traps, are devices designed to end suffering by killing quickly. The force require to kill being greater than that required to catch and hold an animal, such traps need greater structural strength in all their elements to contain and utilize this energy. Greater energy is required in the manufacture of said elements. Therefore, such traps are overly expensive for the task they perform. When the processes of pest control comprise trapping, destruction, and disposal of numerous animals, greater efficiency may be had by combining the processes of destruction and disposal than by imparting to each trap the power to kill. The most ubiquitous device for the purpose of catching rats and mice is of the killing type, and while this particular form has been a model of cost efficiency, requiring neither machining nor exact fitting of parts for construction, and while it provides for a degree of success, it remains inefficient when applied to large scale trapping and an examination of this trap's disadvantages may serve to illustrate the limitations of all such devices.

The most common mouse trap offers a bait attached to a device which in form is mostly mechanical and not, in itself, of use or interest to the animal and which provides no advantage when other food is available. In this way, the design of said trap does not serve to attract the animal. Furthermore, the bait is attached to a mechanical element of the device in such a way that, in order to activate the mechanism of this trap, an animal must move the element while eating the bait. An animal may, however, eat or remove the bait without activating the trap, and the phenomenon of having the bait stolen is not unknown. In this way, the design of the trap does not serve directly to cause an animal to activate said mechanism. Also, though the intent of the common mouse trap is to quickly kill the mouse, in practice this goal is achieved less than one hundred percent of the time. Since a striker must move through a long arc before contacting the animal, said animal may react quickly enough to remove itself from the effective range of the trap. Further, though the most effective killing area is limited to a few degrees, the design of this trap allows an approach to the bait from any direction. The design does not position animals for consistent results. Further, as the triggering mechanism relies on a precariously balanced member, deftness and caution are required in the baiting and setting of this trap, limiting the number of traps that may be set in a given amount of time. Also, said trap, especially in the size designed for rats, represents a hazard to children and non-target animals and, although lighter and more compact than most live traps, devices that by design kill or injure the animal are of no use to the worker in the field who wishes to capture and release animals for the purpose of scientific study. Finally, whether for reasons concerning sanitation or for convenience, common mouse traps and more expensive devices, as well, are often discarded after a single use. In the interests of economy and conservation a device which may be used as disposable should consist of as little material and represent as little investment as possible.

SUMMARY OF THE INVENTION

An objective of the invention is to provide a trap which embodies all the requirements for effectiveness and efficiency in operation.

Another objective of the invention is to provide a trap which is small, light, easily assembled and of low cost.

Another objective of the invention is to provide a trap which catches without injuring or causing undue pain, and which presents no danger to the user, other people, or non-target animals.

Another objective of the invention is to provide a trap which is easy to bait and set.

In the preferred embodiment, common material such as paperboard is stamped and prepared for folding according to a pattern which includes in its form the body and working mechanism as well as most means for alignment and assembly of a small animal trap; said pattern being designed to facilitate the motions of the hand and, as by holding parts in temporary alignment, to assist construction, so that when a predetermined progression of steps is followed, assembly may be completed in minimal time. Elements to be applied to the pattern during construction are either pre-existing or may be manufactured by direct methods and include, in their design, means for application so that few tools are required for assembly. While these features provide for low production costs, they also allow for the option of assembly or completion of assembly by the user if economic limitations or storage limitations, as on board ships, make this preferable.

The assembled trap comprises an enclosure or box large enough to contain the anterior portion of a targeted animal; a member which hinges from the opening to the enclosure and which has, at its free end, points for providing grip against the body of an animal, and a mechanism, releasable by the animal, for supporting said member, in set position, inward relative to the enclosure.

In form, the device presents to an animal a small, therefore less threatening exterior, of bland material and non-mechanical shape. The mechanism needs no clearance from above in order to operate, so the trap may be placed under existing structure or objects, lessening the caution producing effect of introducing something new to the environment. The form of the trap provides a small hole and small space for the animal's inspection. Rats and mice, being users of small holes and small spaces and needing either to find them or make them for survival, seem predisposed to recognize and explore such situations wherever they occur. In this way the design of the trap serves to attract the animal.

If the trap is not pre-baited, a containment for bait maybe provided, accessible through the underside of the device, which may be sealed after baiting by removing a temporary cover to an overlying tape and pressing the tape over the containment. Since the enclosure is small, reaching the bait requires little commitment of the animal's body. Therefore, the design serves to entice the animal.

Access to the bait is limited by a member of the folded pattern which serves as a lever to trigger and release the trapping mechanism and which, due to said member's width, length and supported height above the bait, must be contacted by the animal in any attempt to reach the bait. In this way, the animal is caused by the design of the trap to activate the mechanism. Linkage to the trapping member includes a member which acts as a lever to reduce the force on said triggering member so that minimal exertion is required of an animal to release the mechanism.

Upon release, the trapping member is moved, by the contraction of a rubber band, toward the opening of the enclosure and the points of this member contact the body of the animal. In set position, these points are held in close proximity to the animal's body so this movement is much quicker than the reaction time of the animal. Additionally, the single, narrow entrance to the enclosure, combined with the low position of the triggering lever, serve to position the animal, assuring correct engagement. When engaged, the trapping member remains in an inward attitude relative to the enclosure and the geometry of the device is such that, although little initial pressure is generated by the mechanism, force generated by an animal in attempting to withdraw from the trap is converted to greater pressure against the gripping points. Said points need not be designed for penetration and may be such that the animal is incapable of producing enough force to injure itself yet is held securely by the trap. In this holding function, the present invention bears resemblance to certain devices which are used for ascending ropes wherein a notched cam provides a holding pressure against a rope and wherein said pressure increases proportionally to a load in one direction while allowing the rope to pass through unhindered in the opposite direction. Since forces against the trap of the present invention are directed through the hinging member to the hinge and call into play the tensile strength of the material of construction, a force greater than the weight of the animal is required to break the trap and escape of the animal by withdrawal is impossible. Additional advantages of the present invention include that the animal, confined by the enclosure, is without room to use its teeth for gnawing and that the user of the trap is guarded from the animal. Release of the animal is safely accomplished by pulling the rear—projecting end of the mechanical linkage, thereby taking pressure off the holding points. Achievement of objects and further advantages of the present invention may be more completely understood from the full disclosure and the drawings.

DETAILED DESCRIPTION OF THE PREFERRED EMBODIMENT

Figure 1:
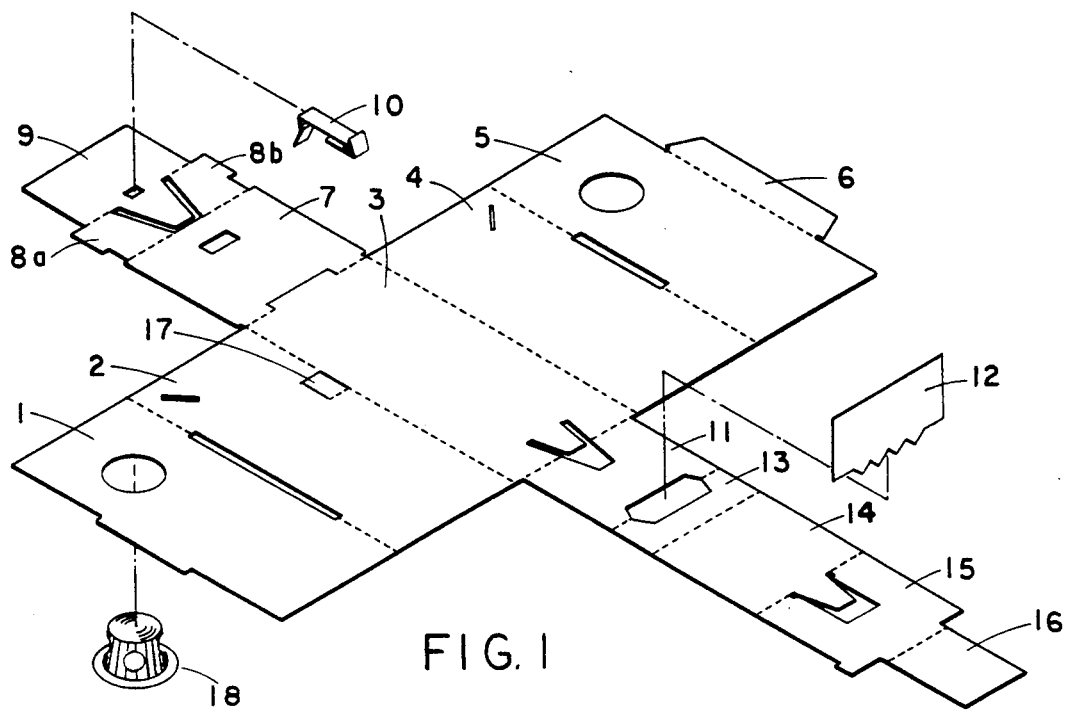
FIG. 1 is an isometric view of a pattern for the preferred embodiment.
Figure 2:
FIG. 2 is an enlarged, cross-sectional view of a plastic extrusion to be applied during assembly.
Figure 3:
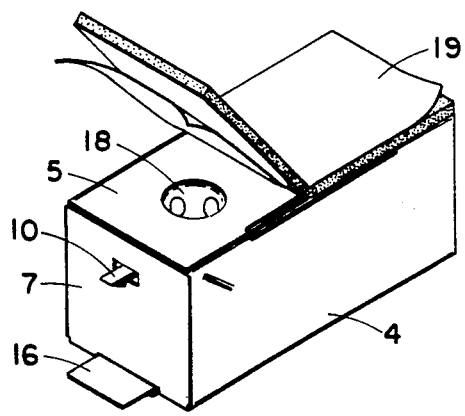
FIG. 3 is an isometric view of the assembled device, inverted, showing rear and access to the bait container.
Figure 4:
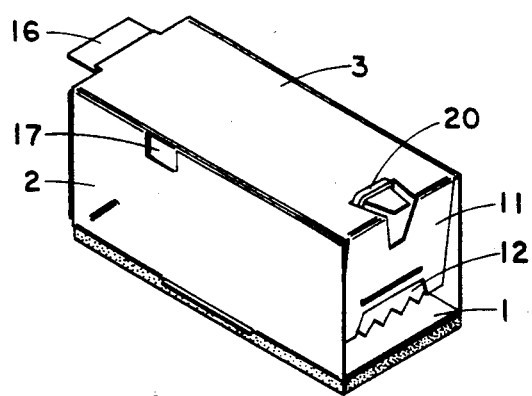
FIG. 4 is an isometric view of the assembled trap from the front.

FIG. 1 shows a pattern to be stamped from sheet material. In the preferred embodiment the material of choice is paperboard or a material with similar characteristics, encompassing a range of products that may be treated in a number of ways, e.g. for resistance to moisture. This inexpensive material and the technologies for processing it are readily available in the packaging industry. Paperboard may be folded to create a form and, compressed or partially de-laminated along a line for folding, the material retains much of its original strength so that the fold may be used as a hinge to relate moving parts of a mechanism. Referring to FIG. 1, members for the body and working mechanism of a device of the present invention may be formed by folds in the material designated by broken lines. Members 1 through 7 form an enclosure or box, wherein member 3 is the top; members 2 and 4 are sides parallel to one another; member 7, being slightly wider than the outside width of the finished box, is the back, and members 1 and 5 form the bottom, with the tab end of member 1 fitting through a slot provided between members 4 and 5, and member 5 overlapping member 1 to provide a secondary bottom. Member 6 forms a tab with tapered edges and with material removed from the bottom of these edges to form, on either side, notches corresponding to the thickness of the material so that when, as a final step in assembly, said tab is inserted through a slot provided between members 1 and 2, and snapped into place, all members forming the body of the enclosure are locked into place. While other methods of closure are possible, doubling the bottom in this way allows for assembly without tools or adhesives and provides increased resistance to flexing in this area where deformation under pressure would decrease the holding power of the trap In use, tab 6 is under little direct stress and holds the structure together adequately. Member 8 is divided into sections a and b and functions to lock back member 7 into position when the tab ends of said sections are put through corresponding angled slots provided in side members 2 and 4. Additionally, the width of member S across the area adjacent to the tabs corresponds to the inside width of the enclosure so that, when locked into place, the members forming the sides and bottom of the enclosure are stabilized against movement from side to side. Member 9 hinges in relation to sections 8a and 8b and forms a lever for activating the trapping mechanism. In length and width this member is sized to move freely between the parallel sides of the enclosure while limiting access to a bait above which said member is supported horizontally. A tapered end section is provided on this member the outermost end of which is sized to move freely in a corresponding opening provided in member 7. Tapering this section allows for less material to be removed from member 9, which must retain stiffness to function properly. For the same reason material is removed from around the tapered section in the stamping process to allow ease in folding this member during assembly. Element 10 is a slice of a plastic extrusion designed to provide a small edge or hook and a small ramp-like surface to the outermost end of member 9 as a catch for engaging and holding the end of the mechanical linkage when the trap is set. This element, better shown in enlarged cross section in FIG. 2, is sized to fit the material of construction and has, at its anterior end, means for clipping into an opening provided in member 9. Member 11 hinges to the front edge of top member 3 and, together with element 12 and member 13, forms a member for engaging the body of an animal. Element 12, which may be punched from a relatively thin, stiff, dense material such as plastic is formed at one end with a serrate edge, having points for the purpose of focusing pressure against the body of an animal sufficiently to cause a gripping effect. In assembly, this element, which is sized slightly wider than members 11 and 13 so that it may be controlled, is inserted and sandwiched between members 11 and 13 with said points protruding through an opening provided between these members, said opening being shaped to allow contact of the points, without interference, against the body of an animal. Said members and said elements are then united by a staple. Members 14 and 15 form a connecting member to support the trapping member in set position. An opening is provided in member 15 to allow the insertion of a small rubber band through this member to be fit over a tapered tab provided on member 14. This opening narrows along its length and is provided with small notches near the base of said tab so that the rubber band, passed through the opening, may be stretched and clipped into said notches; thereby held in proper position. Member 16 forms the end of the mechanical linkage and a lever to hold the mechanism, set, against the force of the rubber band. A typical assembly procedure would be as follows. With respect to FIG. 1, separate members are folded either positively, i.e. toward the viewer or negatively, i.e. away from the viewer. Members 7 is folded positively creating an opening along the line of connection between this member and member 3 where the material is cut as indicated by solid lines. Member 8 is folded positively. Member 9 is folded negatively and element 10 is applied to this member. If member 9 is folded to its greatest extent against members 8 at this time an upward spring is imparted to its outermost end. The end of element 10 is passed through the small opening in member 7 and allowed to hook onto the outside of this member, holding members in temporary alignment. Members 11 and 13 are folded positively, element 12 inserted between these members and the three are stapled together. A rubber band is inserted through the opening in member 15, clipped into place, and members 14, 15 and are folded negatively. Member 16 is brought over positively and inserted through the opening between members 7 and 3. Side members 2 and 4 are folded positively and the tab ends of member 8 are put through the diagonal slots in these members. Bottom-member 1 is brought over positively and this member's tab end is put through the opening provided between members 4 and 5. Element 18 is a container for bait and in the drawing an example of such a container is shown which may be made by forming thin plastic material into a perforated thimble shape having a flange at its base. The container is put into the opening provided in member 1 and held in place by secondary bottom member 5 which is folded over positively. Alternately, a suitable container may be made by other methods such as forming perforated flat material into a four sided cage with corresponding four sided openings provided in the bottom members or the trap may be pre-baited without a container. Member 6, folded positively, is put through the opening between members 1 and 2, and pushed in until it clips onto the inside of member 1, locking the box together. Member 17, pushed in, functions to contact a tab provided on member 15 to limit the return of the mechanism through the enclosure. A tape with a removable covering on part of its surface is applied to the bottom of the device for the purpose of covering the bait container after baiting. In the example shown in FIG. 3 the tape 19 is a foamed plastic product having adhesive on both sides and serves as one method for fixing the device to a surface such as a floor or shelf. In FIG. 4 may be seen the relation of element 12 to member 11, the staple which unites the parts of the trapping member, and a tapered opening at the top of member 11 in association with a tapered tab provided on top member 3. As the final step of assembly the rubber band 20 is reached through said opening with a hook-like tool, such as a crochet hook, and pulled over said tab.

Figure 5:
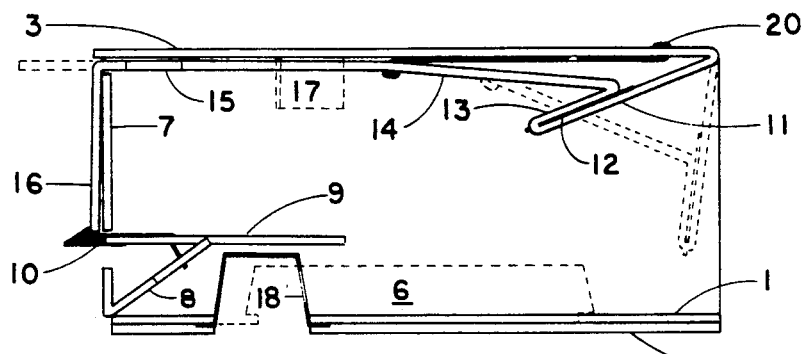
FIG. 5 is a side elevation showing relation of moving parts.

FIG. 5, a side elevation, shows the relation of the moving parts of the mechanism. The animal engaging member, comprising members 11 and 13 and element 12, hinges from top member 3. In the unset position, indicated by broken lines, this member is held at a slight inward angle, determined by the location of member 17, to avoid interference with the outside edges of the side members of the enclosure. Pushing the animal engaging member upward and against the inside top of the enclosure stretches the rubber band 20, storing energy for return to unset position, and forces member 16 through the opening between the top of the enclosure and back member 7. Member 16, folded downward and against the outside back of the enclosure, is engaged by element 1? which, having an upward spring limited by the upper edge of the associated opening in back member 7, receives and holds the edge of member 16. The animal engaging member may then be released and the trap is set. In this position, member 16 acts as a lever with the lower edge of the opening through which it passes acting as a fulcrum and the force on element 10 to hold the rubber band stretched is reduced. Due to the light weight of the parts of the device and the in-line way in which forces are opposed, the trap is stable when set and may be handled in most ways and moved or placed without activating the mechanism.

Member 9 is supported horizontally at an optimum point along its length by member 8 and limits access to bait container 18. Upward movement of the front edge of member 9 a distance roughly equal to the depth of the edge provided on element 10, releases member 16 and allows the animal engaging member to be returned toward the unset position. This movement is accomplished by an animal by the act of trying to lift or squeeze under member 9 to gain access to the bait.

Figure 6:
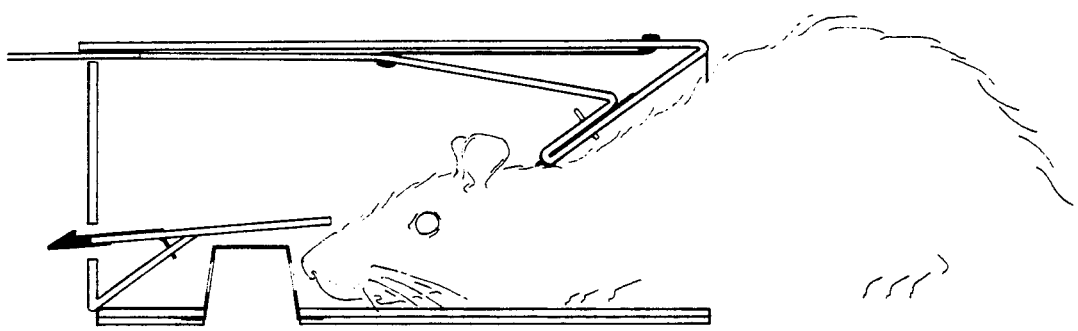
FIG. 6 is a side elevation with animal for scale.

FIG. 6 shows the mechanism sprung and an animal for approximate scale. Once a grip has been established, effort toward rearward movement by the animal forces the hinging member rearward and downward; decreasing the distance between the end of this member and the inside bottom of the enclosure and increasing the pressure on the gripping points against the animal's body. Additionally, pressure, and therefore friction, between the animal and the bottom of the enclosure is increased and this friction is a component of the holding power of the trap. The animal, then, is held by the geometry of the device, so the rubber band need be strong enough only to operate the mechanism smoothly and to provide a continuous, positive pressure against the animal.

As may be seen from the drawing, the relative lengths of the various members of the mechanism may be adjusted to best correspond to the anatomy of an animal. Further, the device is size specific within a range and should be made to fit an optimum size of a targeted species. Where sizes within a species vary widely or where more than one species occur together, two or more sizes of trap could be employed. Being light weight, it may be desirable in many instances of use to fix the trap in place, and to this end the device may be adapted with means such as tabs or extensions of the main body, notches, holes, or added elements allowing the device to be attached to surface or object, or secondary enclosures allowing the device to be partially buried; the adaptation or combination of adaptation employed dependent on the environment of use.

Figure 7:
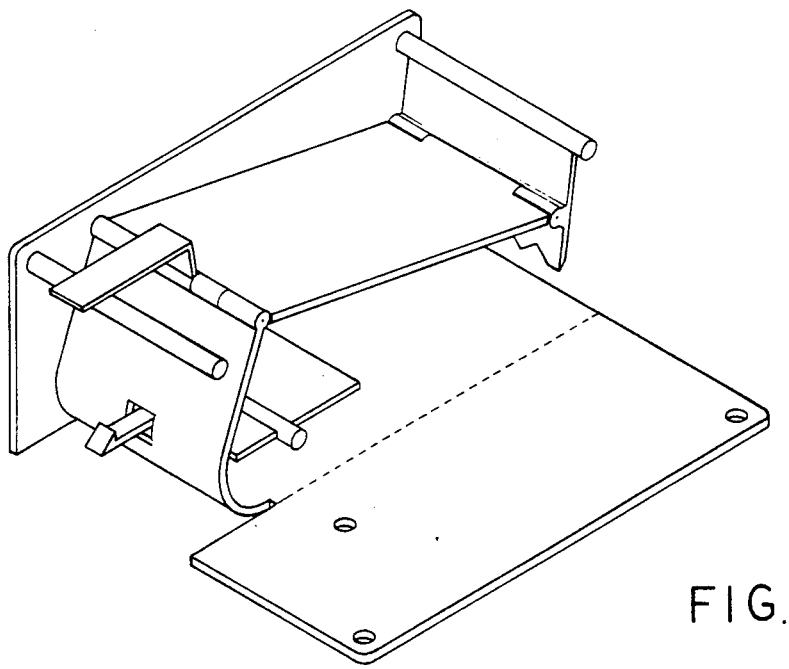
FIG. 7 is an isometric view, with mechanism exposed, showing a species of the present invention which could be made from metal or plastic.

FIG. 7 is an isometric view with the near side shown folded down to show the mechanism of a species according to the present invention which could be made from material such as metal or plastic giving an intrinsic spring for storing energy generally in the bowed area of the body and requiring no applied energy storing element. Parts of the mechanism are formed separately and connected by hinges. While such a device would have increased durability over the preferred embodiment, cost of manufacture would be greater and the harder, more artificial nature of the material of construction might be less attractive to the animal; resulting in decreased effectiveness. It will be obvious to those skilled in the art that a form of the pattern for the preferred embodiment could also be produced in plastic. Elements could be molded in, rather than applied, and the resulting device would have great durability, but effectiveness might be reduced, and the additional problem of disposal of this less readily degradable material would add to the real cost of a system employing the device.

Further development of the preferred embodiment is possible in areas including choice of materials for construction, design modifications to fit the contingencies of the manufacturing process, scenting to increase the attractiveness of the device to the animal or to mask human scent, further provision of self-assembly features, and elimination of steps or development of aids to reduce the time required for assembly.

Having described my invention in sufficient detail to enable those skilled in the art to make and use it, I claim:

1. A device for trapping small animals, comprising:
   an enclosure having an entrance at one end;
   an animal gripping member hinging at the entrance to the enclosure;
   a connecting member having an end hinged to the inner side of said animal gripping member and having an opposite end;
   a lever having an end hinged to said opposite end of said connecting member and having an opposite, free end;
   a top, rear fulcrum whereby said lever may act to support said animal gripping member inwardly;
   a triggering member supported pivotally within the enclosure, having a rear projecting portion provided with a catch for retaining the free end of said lever; and
   an energy storing means acting against said connecting member to urge said animal gripping member toward the entrance to the enclosure.

2. The device of claim 1, wherein said animal gripping member is provided with a serrate edge formed on an insert of dense material.

3. The device of claim 2, wherein the catch is provided on an element formed by extrusion to have means for self attachment to the rear projecting end of said triggering member.

4. The device of claim 3, wherein said energy storing means is a rubber band.

5. The device of claim 3, which further comprises a container for bait, accessible through the bottom of the enclosure, and a tape for covering said container after baiting.

6. As a trap for small animals, a device folded from sheet material, comprising:
   a rectangular area divided across its length by lines of folding into five sections wherein the central section forms the top and the two outermost sections overlap to form the bottom of a box having parallel sides;
   a back section folding from one end of said top section to form a closure for one end of the box;
   a first and second supporting section folding from said back section into the box, having on each section a tab corresponding to a slot provided in each of the side sections of the box such that said back section is held thereby against the end of the box;
   a pivoting section folding from said supporting sections, having a portion forward of the fold movable up and down within the box and a portion rearward of the fold narrowed to extend through an opening provided in said back section such that the extending portion may move up and down in said opening;

a hinging member comprising a first section hinging from the front end of said top section and a shorter second section folding from said first section with an opening provided between said first and second sections such that an insert of dense material having a serrate edge may be sandwiched between said first and second sections with the serrate edge exposed through said opening and held in place by a fastening means;

a connecting section folding from the second section of said hinging member, provided with an opening whereby an urging means may act against said connecting section; and a lever section folding from said connecting section, sized in width to move fore and aft through a slot provided along the line of folding between said top section and said back section and sized in length such that the free end of said lever section may be retained by a catch provided to the extending end of said pivoting section.

7. The device of claim 6, which further comprises a tab on the outermost edge of each of said bottom sections corresponding to a slot provided along the line of folding between the opposite bottom section and its adjacent side section, such that the bottom of the box may be thereby interlocked and the box thereby held together.

8. The device of claim 6, which is further provided with an opening in each of said bottom sections, said openings corresponding such that a container for bait may be held therein and accessed through the bottom of the box.

* * * * *